H. A. HUMMER & J. H. STOVER.
Expansible Belt Pullies.
No. 134,061.  Patented Dec. 17, 1872.
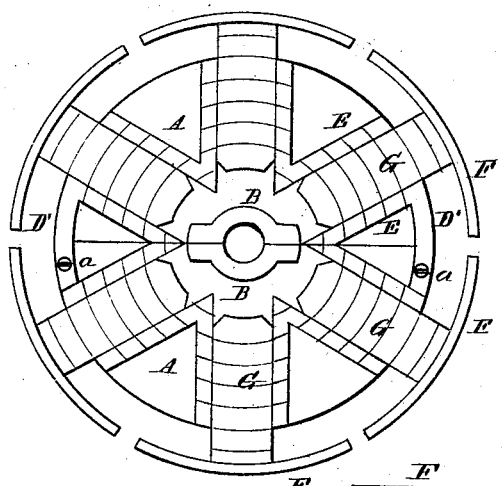
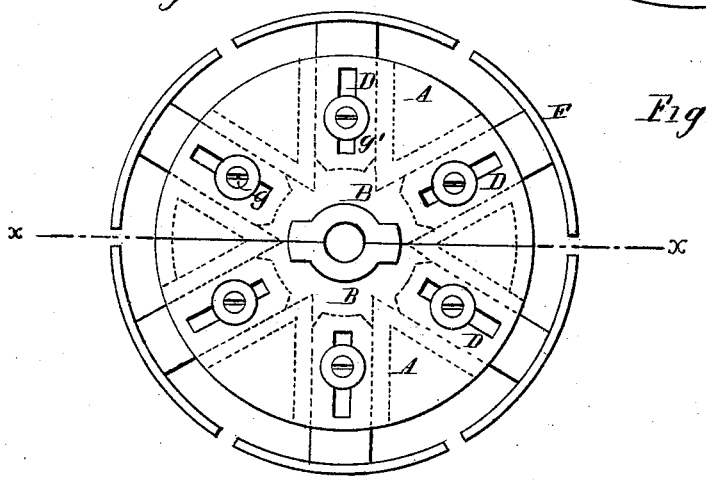
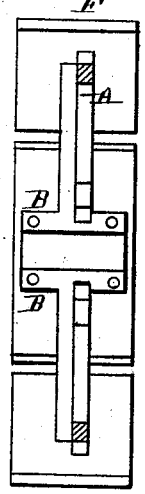
Witnesses.
E. A. Bates,
Geo. E. Upham.
Inventors
Herbert A. Hummer,
Jordan H. Stover,
Chipman Hosmer & Co
Attys.

UNITED STATES PATENT OFFICE.

HERBERT A. HUMMER AND JORDAN H. STOVER, OF FRENCHTOWN, N. J.

IMPROVEMENT IN EXPANSIBLE BELT-PULLEYS.

Specification forming part of Letters Patent No. 134,061, dated December 17, 1872.

*To all whom it may concern:*

Be it known that we, HERBERT A. HUMMER and JORDAN H. STOVER, of Frenchtown, in the county of Hunterdon and State of New Jersey, have invented a new and valuable Improvement in Expansible Belt-Pulleys; and we do hereby declare that the following is a full, clear, and exact description of the construction and operation of the same, reference being had to the annexed drawing making a part of this specification, and to the letters and figures of reference marked thereon.

Figure 1 of the drawing is a representation of a front view of our invention; Fig. 2 is a back view of the same; and Fig. 3 is a sectional view of the same.

This invention has relation to expansible belt-pulleys; and it consists in the novel method of securing together the two separable halves of which the body of the pulley is composed, in connection with adjustable sections, substantially as hereinafter described.

Referring to the drawing, A A designate the two semicircular plates composing the body of our improved sectional expansible pulley. B B designate the box through which the shaft passes. Said box is made also in two halves, one half being formed on each of the plates A A, as shown. The object in making the body of the pulley in two parts is to enable it to be put on a shaft between other pulleys, or where it could not conveniently be put on at the end of the shaft. D designates radial slots formed in the parts A A at equal distances apart. E represents flanges formed upon or attached to one side of the pulley and running parallel with the slots, as shown. These flanges meet in pairs at their inner ends, forming V-shaped projections. F designates segmental sections of the rim, one section corresponding to each slot, and provided with a radial arm, G, passing beween two of the flanges E, furnished with a bolt, $g$, to pass through the slot between said flanges. These bolts are furnished with nuts $g'$, by means of which the segmental sections are secured in place. The inner ends of the radial arms have concave recesses concentric with the grooved parts of the box or collar B B, and designed to allow the arms to be pushed in close to the box. The sides of said arms at their inner ends are beveled so that when the arms are pushed in they may be allowed to fit closely together. By moving said arms in and out the sectional rim of the pulley is expanded or contracted, as the case may be, and the diameter of the pulley thereby varied. Two of the flanges E have segmental extensions D', which project beyond the diametric edge of the part A to which it is attached. The two sections A A are secured together by bolts or screws $a$ passing through the flanges D', and by others connecting the flanged parts or lugs $d$ of the box B, as shown.

The flanges D' may be curved plates bolted to both sections A.

What we claim as our invention, and desire to secure by Letters Patent, is—

The section-plates A A having sectional hubs B, flanges E, and slots D adapted to receive the adjustable fellies F, substantially as specified.

In testimony that we claim the above we have hereunto subscribed our names in the presence of two witnesses.

HERBERT A. HUMMER.
    JORDAN H. STOVER.

Witnesses:
 WILLIAM T. SROPE,
 JACOB STOVER.